(12) United States Patent
Matsuda

(10) Patent No.: US 11,376,955 B2
(45) Date of Patent: Jul. 5, 2022

(54) UTILITY VEHICLE

(71) Applicant: KAWASAKI MOTORS, LTD., Akashi (JP)

(72) Inventor: Yoshimoto Matsuda, Kobe (JP)

(73) Assignee: KAWASAKI MOTORS, LTD., Akashi (JP)

( * ) Notice: Subject to any disclaimer, the term of this patent is extended or adjusted under 35 U.S.C. 154(b) by 260 days.

(21) Appl. No.: 16/555,657

(22) Filed: Aug. 29, 2019

(65) Prior Publication Data

US 2021/0061094 A1 Mar. 4, 2021

(51) Int. Cl.
| | |
|---|---|
| *B60K 17/356* | (2006.01) |
| *B60K 23/08* | (2006.01) |
| *B60K 17/354* | (2006.01) |
| *B60L 50/10* | (2019.01) |
| *B60K 17/348* | (2006.01) |
| *B60K 1/04* | (2019.01) |
| *F16D 48/02* | (2006.01) |
| *B60K 17/02* | (2006.01) |
| *B60G 7/00* | (2006.01) |

(52) U.S. Cl.
CPC .............. *B60K 17/356* (2013.01); *B60K 1/04* (2013.01); *B60K 17/02* (2013.01); *B60K 17/348* (2013.01); *B60K 17/354* (2013.01); *B60K 23/08* (2013.01); *B60L 50/10* (2019.02); *F16D 25/14* (2013.01); *B60G 7/001* (2013.01); *B60K 2001/0422* (2013.01)

(58) Field of Classification Search
CPC .... B60K 17/348; B60K 17/35; B60K 17/354; B60K 17/356; B60K 23/08; B60K 23/0808; B60L 50/10
See application file for complete search history.

(56) References Cited

U.S. PATENT DOCUMENTS

| | | | | |
|---|---|---|---|---|
| 4,923,025 A | * | 5/1990 | Ellers ........................ | B60K 6/52 180/65.23 |
| 5,495,906 A | * | 3/1996 | Furutani ................. | B60K 6/442 180/65.23 |
| 5,839,535 A | * | 11/1998 | Arai ...................... | B60W 10/08 180/197 |
| 6,205,379 B1 | * | 3/2001 | Morisawa ............. | B60W 10/26 701/22 |
| 6,434,469 B1 | * | 8/2002 | Shimizu ................ | B60W 20/00 701/84 |

(Continued)

*Primary Examiner* — Tony H Winner
*Assistant Examiner* — Michael R Stabley
(74) *Attorney, Agent, or Firm* — Alleman Hall Creasman & Tuttle LLP

(57) ABSTRACT

A utility vehicle includes: a pair of front wheels; a pair of rear wheels; at least one front wheel power source configured to drive the front wheels and not to drive the rear wheels; at least one rear wheel power source configured to drive the rear wheels and not to drive the front wheels; and a controller that controls the front wheel power source and the rear wheel power source. Upon receiving a predetermined two-wheel drive command, the controller brings the front wheel power source into a non-operative state while allowing the rear wheel power source to drive the rear wheels. Upon receiving a predetermined four-wheel drive command, the controller brings the front wheel power source into operation while allowing the rear wheel power source to drive the rear wheels.

16 Claims, 7 Drawing Sheets

(56) References Cited

U.S. PATENT DOCUMENTS

| | | | |
|---|---|---|---|
| 6,898,505 B2* | 5/2005 | Kadota | B60K 28/16 701/71 |
| 7,102,313 B2* | 9/2006 | Kadota | B60W 30/184 318/465 |
| 7,152,707 B2* | 12/2006 | Matsuda | B60W 10/08 180/243 |
| 7,234,553 B2* | 6/2007 | Shimizu | F16D 48/06 180/65.25 |
| 7,374,000 B2* | 5/2008 | Yamamoto | B60W 20/00 180/65.285 |
| 7,451,850 B2* | 11/2008 | Tokunou | B60L 7/003 180/242 |
| 8,265,845 B2* | 9/2012 | Yamamura | F16H 37/082 701/69 |
| 8,613,336 B2 | 12/2013 | Deckard et al. | |
| 9,327,587 B2* | 5/2016 | Spindler | B60K 5/00 |
| 9,540,052 B2* | 1/2017 | Burt, II | B62D 33/0617 |
| 9,845,006 B2* | 12/2017 | Ogawa | B60K 17/344 |
| 9,981,552 B2* | 5/2018 | Ogawa | F16D 11/00 |
| 10,295,036 B2* | 5/2019 | Hock | F16H 48/22 |
| 10,518,639 B2* | 12/2019 | Shigeta | B60K 23/0808 |
| 10,668,801 B2* | 6/2020 | Von Koenigsegg | B60K 1/02 |
| 2003/0064858 A1* | 4/2003 | Saeki | B60K 23/0808 477/166 |
| 2003/0089539 A1* | 5/2003 | Kadota | B60L 50/15 180/65.225 |
| 2005/0150702 A1* | 7/2005 | Matsuzaki | B60K 6/52 180/197 |
| 2005/0211489 A1* | 9/2005 | Kowatari | B60K 28/16 180/243 |
| 2007/0017717 A1* | 1/2007 | Kuper | B60K 7/0007 180/197 |
| 2008/0023240 A1* | 1/2008 | Sunsdahl | B60K 5/00 180/68.2 |
| 2010/0317485 A1* | 12/2010 | Gillingham | B60L 7/12 477/7 |
| 2016/0144855 A1* | 5/2016 | Saito | B60T 8/1766 701/70 |
| 2017/0182887 A1* | 6/2017 | Ogawa | F16D 11/00 |
| 2017/0313174 A1* | 11/2017 | von Koenigsegg | B60K 6/50 |
| 2018/0086374 A1* | 3/2018 | Sato | B62D 1/046 |
| 2018/0370356 A1* | 12/2018 | Shigeta | F16D 23/02 |

* cited by examiner

UTILITY VEHICLE

BACKGROUND OF THE INVENTION

Field of the Invention

The present disclosure relates to a utility vehicle.

Description of the Related Art

U.S. Pat. No. 8,613,336 B2 discloses a utility vehicle configured to travel on uneven terrains. Such a utility vehicle generally includes a power unit mounted in a vehicle body of the vehicle, the power unit including an engine and a continuously variable transmission (CVT). Drive power is transmitted from the power unit to front and rear axles. The drive power transmitted from the power unit to the front axle is transmitted to a right front wheel and a left front wheel via a front differential gear. Between the power unit and the front differential gear is provided a clutch device for switching between two-wheel drive and four-wheel drive.

SUMMARY OF THE INVENTION

A utility vehicle according to an aspect of the present disclosure includes: a pair of front wheels; a pair of rear wheels; at least one front wheel power source configured to drive the front wheels and not to drive the rear wheels; at least one rear wheel power source configured to drive the rear wheels and not to drive the front wheels; and a controller that controls the front wheel power source and the rear wheel power source, wherein upon receiving a predetermined two-wheel drive command, the controller brings the front wheel power source into a non-operative state while allowing the rear wheel power source to drive the rear wheels, and upon receiving a predetermined four-wheel drive command, the controller brings the front wheel power source into operation while allowing the rear wheel power source to drive the rear wheels.

With the above configuration, when the rear wheel power source is in operation to drive the rear wheels, the vehicle can be operated in the two-wheel drive mode by bringing the front wheel power source into a non-operative state and in the four-wheel drive mode by bringing the front wheel power source into an operative state. Thus, two-wheel drive/four-wheel drive switching can easily be achieved by control of the front wheel power source.

The above and further objects, features and advantages of the present disclosure will be more apparent from the following detailed description of preferred embodiments with reference to the accompanying drawings.

DETAILED DESCRIPTION OF THE EMBODIMENTS

Hereinafter, embodiments will be described with reference to the drawings.

First Embodiment

Figure 1:
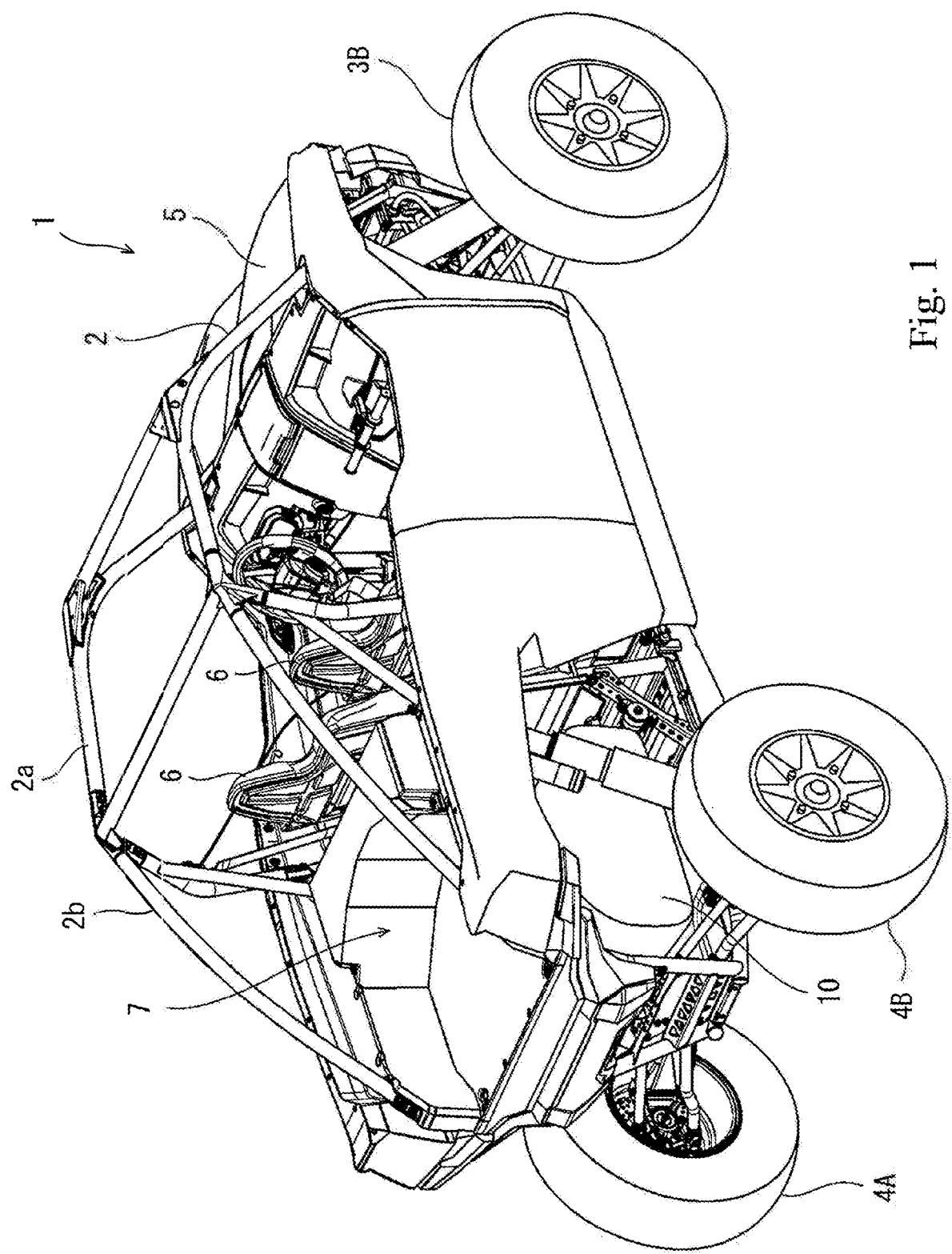
FIG. 1 is a perspective view of a utility vehicle according to a first embodiment.
Figure 2:
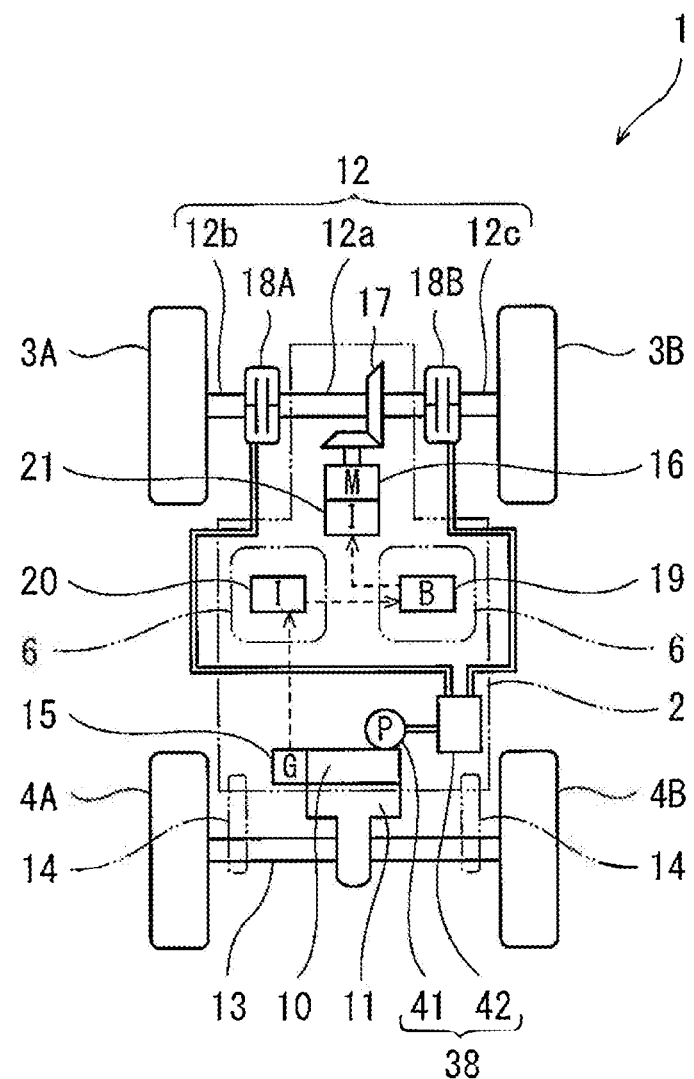
FIG. 2 is a plan view of a drive system of the utility vehicle shown in FIG. 1.

FIG. 1 is a perspective view of a utility vehicle 1 according to a first embodiment. FIG. 2 is a plan view of a drive system of the utility vehicle 1 shown in FIG. 1. As shown in FIGS. 1 and 2, the utility vehicle 1 includes left and right front wheels 3A and 3B supported by a front portion of a vehicle body frame 2 and left and right rear wheels 4A and 4B supported by a rear portion of the vehicle body frame 2. The space between the left and right front wheels 3A and 3B is covered from above by a hood 5 made of resin. A pair of occupant seats 6 (driver seat and passenger seat) are disposed rearwardly of the hood 5 and located in the vicinity of the center of the vehicle body frame 2 in a forward/rearward direction.

The vehicle body frame 2 includes a cabin frame part 2a and a pair of left and right rear gusset frame parts 2b. The vehicle body frame 2 is a pipe frame constructed of a plurality of pipe members connected together. The cabin frame part 2a is formed to surround the occupant space in which the occupant seats 6 are disposed. The occupant space surrounded by the cabin frame part 2a is exposed to the outside of the vehicle. The rear gusset frame parts 2b connect an upper portion of the cabin frame part 2a to a rear portion of a rear frame part (not illustrated). A cargo carrier 7 forming a recessed cargo-carrying space is provided rearwardly of the occupant seats 6.

As shown in FIG. 2, the left and right front wheels 3A and 3B are connected respectively to the ends of a front axle 12 extending in a leftward/rightward direction. The left and right rear wheels 4A and 4B are connected respectively to the ends of a rear axle 13 extending in the leftward/rightward direction. The left and right rear wheels 4A and 4B are supported by the vehicle body frame 2 via a swing arm 14. To the rear axle 13 is connected a rear wheel power source 10 configured to drive the left and right rear wheels 4A and 4B. The rear wheel power source 10 is an engine. The rear wheel power source 10 is disposed rearwardly of the occupant seats 6. To the rear wheel power source 10 is coupled a transmission 11 that provides a rotational speed change of power generated by the rear wheel power source 10. Drive power is output at a rotational speed resulting from the speed change provided by the transmission 11. To the rear wheel power source 10 is coupled an electricity generator 15 that generates electricity from power of the engine. The drive power output by the rear wheel power source 10 is transmitted to the rear axle 13 via a rear differential gear device. The rear wheel power source 10 is not connected to the left and front wheels 3A and 3B, and cannot drive the left and right front wheels 3A and 3B.

To the front axle 12 is connected a front wheel power source 16 configured to drive the left and right front wheels 3A and 3B. The front axle 12 is divided into a central axle portion 12a, a left axle portion 12b, and a right axle portion 12c. The left axle portion 12b is connected to the left front wheel 3A to provide power transmission to the left front wheel 3A, and the right axle portion 12c is connected to the right front wheel 3B to provide power transmission to the right front wheel 3B. The central axle portion 12*a* is located between the left axle portion 12*b* and the right axle portion 12*c*. The front wheel power source 16 is connected to the central axle portion 12*a* via a bevel gear 17 to provide power transmission to the central axle portion 12*a*. The front wheel power source 16 is an electric motor. The front wheel power source 16 is disposed forwardly of the occupant seats 6. Alternatively, the front wheels may be driven by an engine, and the rear wheels may be driven by a motor.

Below the occupant seats 6 is disposed an electricity storage device 19. The electricity storage device 19 is charged with electricity generated by the electricity generator 15 and delivered via a first inverter 20. The electricity stored in the electricity storage device 19 is supplied to the front wheel power source 16 via a second inverter 21. That is, the front wheel power source 16 is operated with electricity supplied from the electricity storage device 19.

A left clutch 18A is interposed between the central axle portion 12*a* and the left axle portion 12*b*. A right clutch 18B is interposed between the central axle portion 12*a* and the right axle portion 12*c*. When the left clutch 18A is in a disengaged state, the rotational power transmitted from the front wheel power source 16 to the central axle portion 12*a* is not transmitted to the left axle portion 12*b*. When the right clutch 18B is in a disengaged state, the rotational power transmitted from the front wheel power source 16 to the central axle portion 12*a* is not transmitted to the right axle portion 12*c*. In the present embodiment, the left and right clutches 18A and 18B are clutches (e.g., multi-plate clutches) configured to continuously vary the power transmission rates thereof.

The left and right clutches 18A and 18B are individually actuated by power delivered from the clutch actuator 38. For example, the left and right clutches 18A and 18B are hydraulic clutches actuated by hydraulic pressure, and the clutch actuator 38 is a hydraulic actuator. Specifically, the clutch actuator 38 includes a hydraulic pump 41 and a control valve unit 42. The hydraulic pump 41 is driven by the rear wheel power source 10. The control valve unit 42 is controllable between a state in which the control valve unit 42 allows hydraulic pressure of the hydraulic pump 41 to be applied to the left and right clutches 18A and 18B and a state in which the control valve unit 42 blocks hydraulic pressure of the hydraulic pump 41 from being applied to the left and right clutches 18A and 18B. The control valve unit 42 is configured to continuously vary the pressure to be applied to the left and right clutches 18A and 18B from the hydraulic pump 41.

Figure 3:
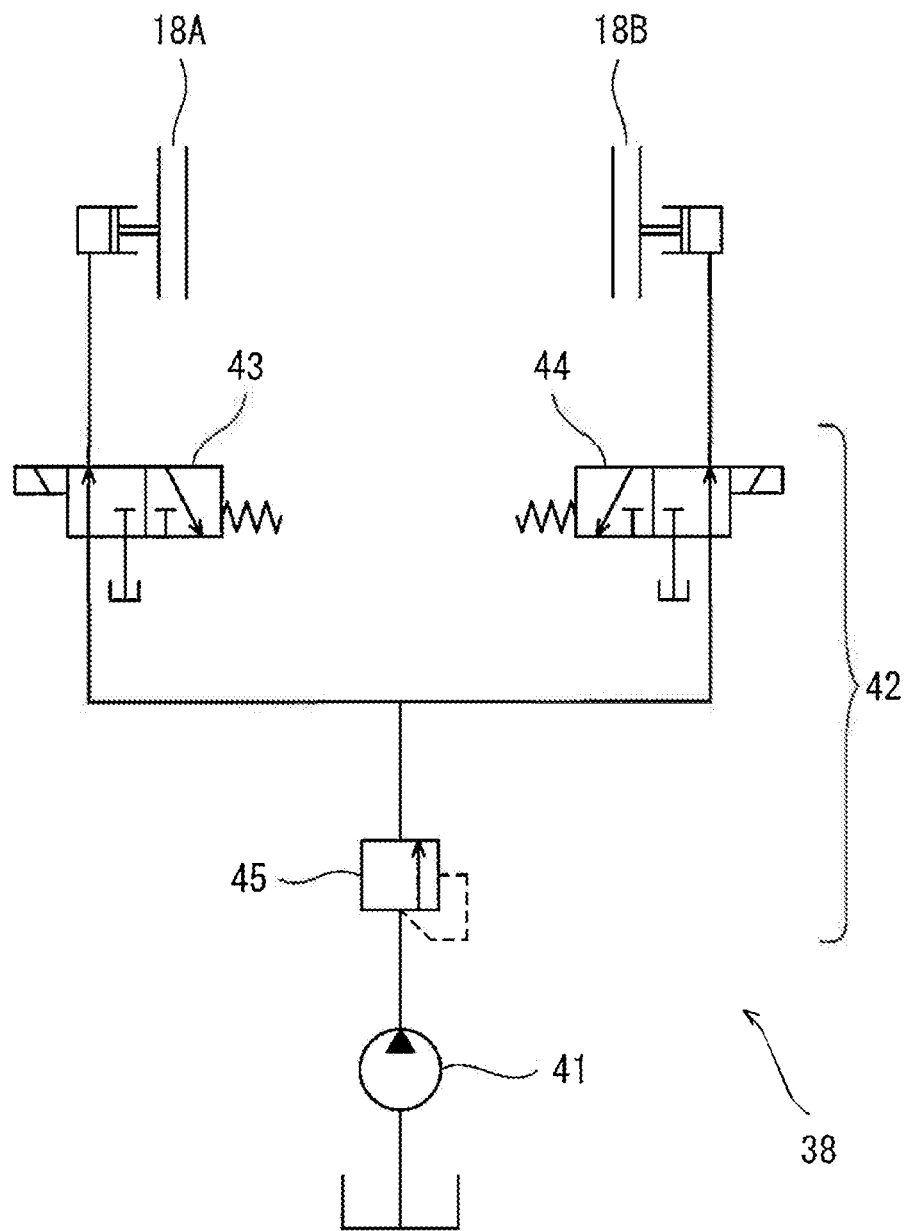
FIG. 3 is a hydraulic circuit diagram illustrating an example of a clutch actuator shown in FIG. 2.

FIG. 3 is a hydraulic circuit diagram illustrating an example of the clutch actuator 38 shown in FIG. 2. As shown in FIG. 3, the clutch actuator 38 includes a first electromagnetically controlled valve 43, a second electromagnetically controlled valve 44, and a relief valve 45. The first electromagnetically controlled valve 43 is configured to control hydraulic pressure applied to the left clutch 18A from the hydraulic pump 41. The second electromagnetically controlled valve 44 is configured to control hydraulic pressure applied to the right clutch 18B from the hydraulic pump 41. The relief valve 45 is configured to prevent a situation where hydraulic pressure delivered to the first and second electromagnetically controlled valves 43 and 44 from the hydraulic pump 41 exceeds a predetermined pressure.

The details of the configuration of the second electromagnetically controlled valve 44 are the same as those of the first electromagnetically controlled valve 43, and therefore the first electromagnetically controlled valve 43 will now be described as a representative. The first electromagnetically controlled valve 43 can be controlled to vary the opening degree of a flow passage from the hydraulic pump 41 to the left clutch 18A and adjust the pressure applied to the left clutch 18A, thereby continuously varying the power transmission rate of the left clutch 18A. In the state where the control valve unit blocks hydraulic pressure of the hydraulic pump 41 from being applied to the left clutch 18A, the first electromagnetically controlled valve 43 causes a port for actuation of the left clutch 18A to communicate with a drain passage. In this state, the left clutch 18A is kept disengaged by a biasing force of a spring (not illustrated).

Figure 4:
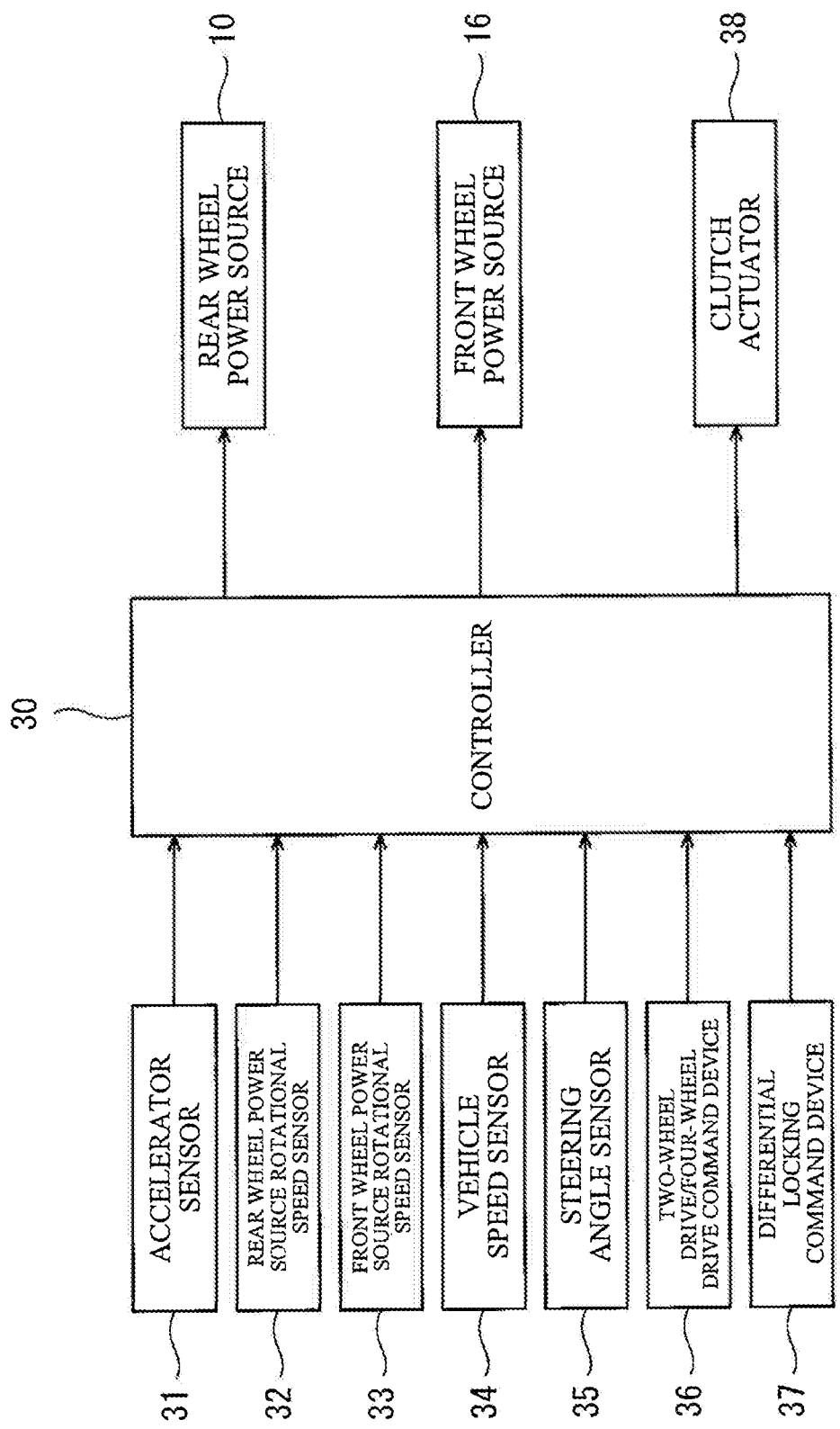
FIG. 4 is a block diagram of a control system of the utility vehicle shown in FIG. 2.

FIG. 4 is a block diagram of a control system of the utility vehicle 1 shown in FIG. 2. As shown in FIG. 4, the utility vehicle 1 includes a controller 30. The utility vehicle 1 includes an accelerator sensor 31, a rear wheel power source rotational speed sensor 32, a front wheel power source rotational speed sensor 33, a vehicle speed sensor 34, a steering angle sensor 35, a two-wheel drive/four-wheel drive command device 36, and a differential locking command device 37, which are provided on the input side of the controller 30. The utility vehicle 1 includes the rear wheel power source 10, the front wheel power source 16, and the clutch actuator 38, which are provided on the output side of the controller 30.

The accelerator sensor 31 is a sensor that detects the amount of operation of an acceleration operation member (e.g., an accelerator pedal) by a driver. The rear wheel power source rotational speed sensor 32 is a sensor that detects the rotational speed of the rear wheel power source 10 (engine). The front wheel power source rotational speed sensor 33 is a sensor that detects the rotational speed of the front wheel power source 16 (electric motor). The vehicle speed sensor 34 is a sensor that detects the travel speed of the utility vehicle 1. The steering angle sensor 35 detects the steering angles of the left and right front wheels 3A and 3B.

The two-wheel drive/four-wheel drive command device 36 is an input device that informs the controller 30 which of the two-wheel drive mode and four-wheel drive mode has ben selected by the driver. When it is automatically determined whether to switch between the two-wheel drive mode and the four-wheel drive mode, the two-wheel drive/four-wheel drive command device 36 may be provided as a command section included in the controller to generate control commands. The differential locking command device 37 is an input device that informs the controller 30 whether the driver intends to bring the left and front wheels 3A and 3B into a synchronized state in which the wheels 3A and 3B are synchronized (a state in which the wheels 3A and 3B run at the same rotational speed). When it is automatically determined whether to bring the left and right front wheels 3A and 3B into the synchronized state, the differential locking command device 37 may be provided as a command section included in the controller to generate control commands.

The controller 30 controls the rear wheel power source 10 and front wheel power source 16 in response to inputs from the accelerator sensor 31, rear wheel power source rotational speed sensor 32, front wheel power source rotational speed sensor 33, and vehicle speed sensor 34. The controller 30 controls the clutch actuator 38 (e.g., the electromagnetically controlled valves 43 and 44) in response to inputs from the accelerator sensor 31, vehicle speed sensor 34, steering angle sensor 35, two-wheel drive/four-wheel drive command device 36, and differential locking command device 37.

Upon receiving a two-wheel drive command from the two-wheel drive/four-wheel drive command device 36, the controller 30 brings the front wheel power source 16 into a non-operative state while allowing the rear wheel power source 10 to drive the left and right rear wheels 4A and 4B (two-wheel drive state). In the two-wheel drive state, the controller 30 controls the rear wheel power source 10 based on detection signals received from the accelerator sensor 31, rear wheel power source rotational speed sensor 32, and vehicle speed sensor 34. Upon receiving a four-wheel drive command from the two-wheel drive/four-wheel drive command device 36, the controller 30 brings the front wheel power source 16 into an operative state while allowing the rear wheel power source 10 to drive the left and right rear wheels 4A and 4B (four-wheel drive state). The controller 30 controls the rear wheel power source 10 and front wheel power source 16 based on detection signals received from the accelerator sensor 31, rear wheel power source rotational speed sensor 32, front wheel power source rotational speed sensor 33, and vehicle speed sensor 34.

In the four-wheel drive state, the controller 30 controls the clutch actuator 38 to cause the power transmission rates of the left and right clutches 18A and 18B to vary as a function of the steering angles detected by the steering angle sensor 35. Upon receiving from the differential locking command device 37 the command to bring the left and right front wheels 3A and 3B into the synchronized state, the controller 30 controls the clutch actuator 38 to keep (fix) both of the left and right clutches 18A and 18B in a fully engaged state.

For detailed explanation, one of the left and right clutches 18A and 18B that is associated with the outer wheel during turning is defined as an outer wheel clutch, and the other clutch associated with the inner wheel during turning is defined as an inner wheel clutch. The controller 30 controls the clutch actuator 38 to cause the power transmission rate of the inner wheel clutch to decrease with increasing steering angle. During straight travel in the four-wheel drive state, both of the left and right clutches 18A and 18B are in a fully engaged state. During straight travel in the two-wheel drive state, the left and right clutches 18A and 18B may be in a fully engaged state or in a disengaged state.

Upon receiving a predetermined specific travel command, the controller 30 temporarily causes the front wheel power source 16 to operate even when the two-wheel drive state has been selected through the differential locking command device 37. For example, upon receiving a start command as the specific travel command, the controller 30 temporarily causes the front wheel power source 16 to operate until a predetermined front wheel drive stopping condition is satisfied, even when the two-wheel drive state has been selected through the differential locking command device 37.

For example, if an acceleration command is detected through the accelerator sensor 31 when the vehicle speed detected by the vehicle speed sensor 34 is lower than a predetermined value (such as when the vehicle speed is zero), the controller 30 determines that a start command to start the vehicle from a stopped state has been issued, and causes the front wheel power source 16 to operate until the front wheel drive stopping condition is satisfied. The front wheel drive stopping condition includes, for example, at least one of the condition that the travel speed crosses a predetermined threshold and the condition that the gear ratio of the transmission 11 crosses a predetermined threshold on a high-speed side. The specific travel command is not limited to the start command and may be, for example, a command manually input by the user.

Upon receiving a predetermined deceleration command from the accelerator sensor 31, the controller 30 brings the electric motor serving as the front wheel power source 16 into a regeneration state, regardless of which of the two-wheel drive command and four-wheel drive command has been received from the two-wheel drive/four-wheel drive command device 36. That is, during deceleration of the utility vehicle 1, the controller 30 causes the front wheel power source 16 to generate electricity using back torque exerted on the left and right front wheels 3A and 3B from the ground surface, thereby applying deceleration torque to the left and right front wheels 3A and 3B.

With the configuration described above, when the rear wheel power source 10 is in operation to drive the left and right rear wheels 4A and 4B, the vehicle can be operated in the two-wheel drive mode by bringing the front wheel power source 16 into a non-operative state and in the four-wheel drive mode by bringing the front wheel power source 16 into an operative state. Thus, two-wheel drive/four-wheel drive switching can easily be achieved by control of the front wheel power source 16.

Additionally, since the front wheel power source 16 is an electric motor and the rear wheel power source 10 is an engine, two-wheel drive/four-wheel drive switching can be achieved by controlling the electric motor into an operative state or a non-operative state while the left and right rear wheels 4A and 4B are stably driven by the engine. Thus, the number of repetitions of the engine startup and shutdown can be reduced to decrease the energy loss, compared to when the front wheel power source 16 is an engine.

Additionally, the controller 30 brings the electric motor serving as the front wheel power source 16 into operation upon receiving a start command, even when the two-wheel drive command has been issued from the two-wheel drive/four-wheel drive command device 36. Thus, driving of the rear-wheels by the engine is assisted by driving of the front wheels by the electric motor which is highly responsive. This enables quick start of the vehicle.

Additionally, the controller 30 brings the electric motor serving as the front wheel power source 16 into a regeneration state upon receiving a predetermined deceleration command through the accelerator sensor 31, regardless of which of the two-wheel drive command and four-wheel drive command has been received. Thus, both in the two-wheel drive state and in the four-wheel drive state, appropriate deceleration can be achieved by engine brake combined with energy regeneration provided by the electric motor.

Additionally, since the electric motor serving as the front wheel power source 16 is operated with electricity supplied from the electricity storage device 19 charged by the electricity generator 15, the electric motor serving as the front wheel power source 16 can be operated with electricity generated by the engine serving as the rear wheel power source 10. This can increase the cruising distance in the four-wheel drive state.

Second Embodiment

Figure 5:
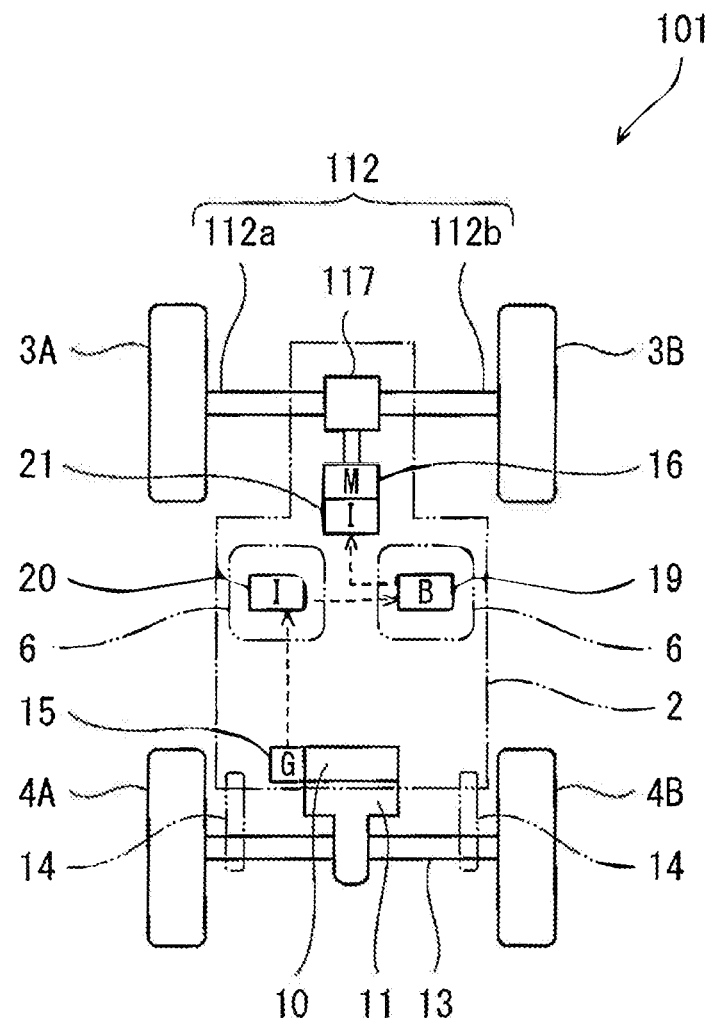
FIG. 5 is a plan view of a drive system of a utility vehicle according to a second embodiment.

FIG. 5 is a plan view of a drive system of a utility vehicle 101 according to a second embodiment. The elements identical to those of the first embodiment are denoted by the same reference signs and will not be described again. As shown in FIG. 5, the utility vehicle 101 includes a front differential gear device 117 provided on a power transmission route leading from the front wheel power source 16 to the left and right front wheels 3A and 3B. The utility vehicle 101 includes a front axle 112, which is divided into a left axle portion 112a and a right axle portion 112b. The left axle portion 112a is connected to the left front wheel 3A to provide power transmission to the left front wheel 3A, while the right axle portion 112b is connected to the right front wheel 3B to provide power transmission to the right front wheel 3B. The front differential gear device 117 is disposed between the left axle portion 112a and right axle portion 112b.

The front differential gear device 117 distributes the drive power output by the front wheel power source 16 to the left and right axle portions 112a and 112b. This makes it possible to establish a state in which the left and right front wheels 3A and 3B are synchronously driven and a state in which the left and right front wheels 3A and 3B are asynchronously driven. The other elements are the same as those of the first embodiment described above and will therefore not be described again.

Third Embodiment

Figure 6:
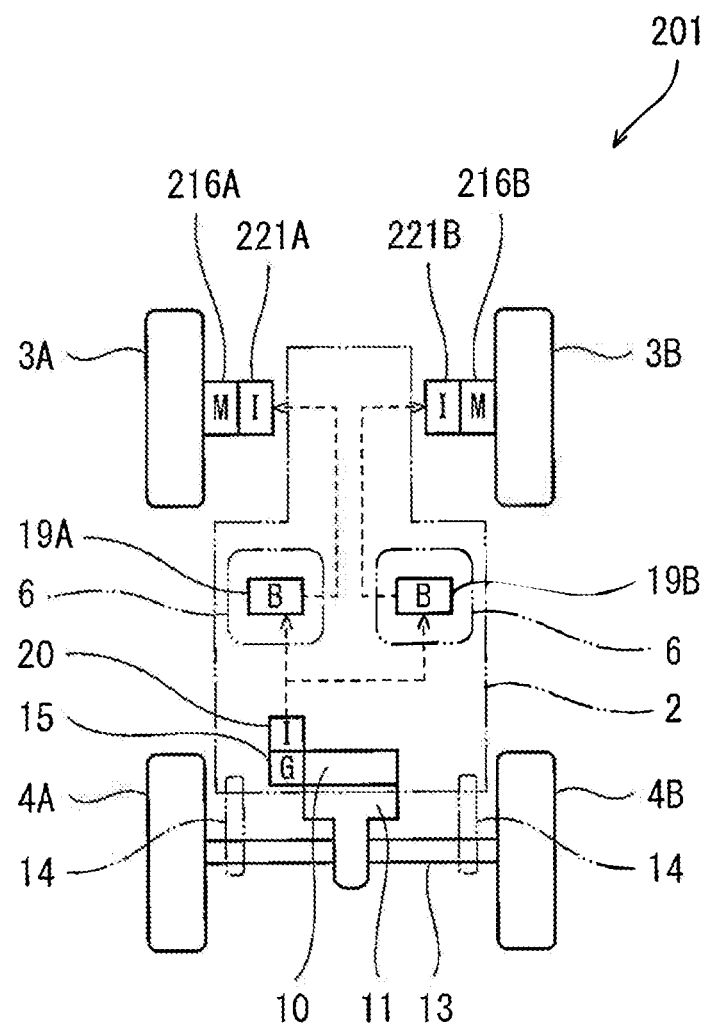
FIG. 6 is a plan view of a drive system of a utility vehicle according to a third embodiment.

FIG. 6 is a plan view of a drive system of a utility vehicle 201 according to a third embodiment. The elements identical to those of the first embodiment are denoted by the same reference signs and will not be described again. As shown in FIG. 6, a first front wheel power source 216A, which is an electric motor, is provided for the left front wheel 3A, while a second front wheel power source 216B, which is an electric motor, is provided for the right front wheel 3B. That is, the left front wheel 3A is driven by the first front wheel power source 216A independently of the right front wheel 3B, and the right front wheel 3B is driven by the second front wheel power source 216B independently of the left front wheel 3A.

A first electricity storage device 19A and a second electricity storage device 19B are disposed below the left and right occupant seats 6, respectively. The first and second electricity storage devices 19A and 19B are charged with electricity generated by the electricity generator 15 and delivered via the first inverter 20. The electricity stored in the first electricity storage device 19A is supplied to the first front wheel power source 216A via a first inverter 221A. The electricity stored in the second electricity storage device 19B is supplied to the second front wheel power source 216B via a second inverter 221B. That is, the electricity supply route from the first electricity storage device 19A to the first front wheel power source 216A and the electricity supply route from the second electricity storage device 19B to the second front wheel power source 216B are independent of each other.

The first front wheel power source 216A and second front wheel power source 216B (the first inverter 221A and second inverter 221B) are controlled independently of each other by the controller 30 (FIG. 4). Thus, good turning performance can be achieved without the left and right clutches 18A and 18B or the front differential gear device 117. Additionally, for example, when only the left front wheel 3A is trapped in a ditch, the vehicle can easily be released from the ditch by driving the right front wheel 3B. The other elements are the same as those of the first embodiment described above and will therefore not be described again.

Fourth Embodiment

Figure 7:
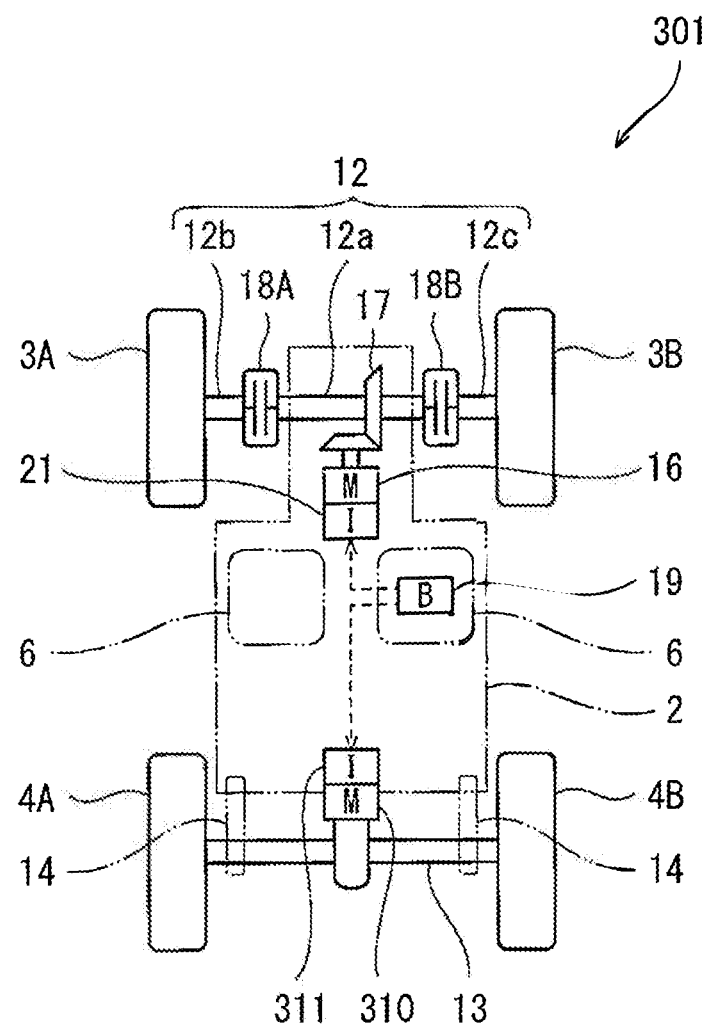
FIG. 7 is a plan view of a drive system of a utility vehicle according to a fourth embodiment.

FIG. 7 is a plan view of a drive system of a utility vehicle 301 according to a fourth embodiment. The elements identical to those of the first embodiment are denoted by the same reference signs and will not be described again. As shown in FIG. 7, the utility vehicle 301 includes an electric motor serving as the front wheel power source 16 and further includes another electric motor serving as a rear wheel power source 310. That is, electricity stored in the electricity storage device 19 is supplied to the front wheel power source 16 via the inverter 21 and to the rear wheel power source 310 via an inverter 311. With this configuration, when the rear wheel power source 310 is in operation to drive the left and right rear wheels 4A and 4B, the vehicle can be operated in the two-wheel drive mode by bringing the front wheel power source 16 into a non-operative state and in the four-wheel drive mode by bringing the front wheel power source 16 into an operative state. The other elements are the same as those of the first embodiment described above and will therefore not be described again.

Many modifications and other embodiments of the present invention will be apparent to those skilled in the art from the foregoing description. Accordingly, the foregoing description is to be construed as illustrative only, and is provided for the purpose of teaching those skilled in the art the best mode for carrying out the invention. The details of the structure and/or function may be varied substantially without departing from the scope of the invention.

What is claimed is:

1. A utility vehicle comprising:
a pair of front wheels;
a pair of rear wheels;
at least one front wheel power source configured to drive the front wheels and not to drive the rear wheels;
at least one rear wheel power source configured to drive the rear wheels and not to drive the front wheels; and
a controller that controls the front wheel power source and the rear wheel power source, wherein
upon receiving a predetermined two-wheel drive command, the controller brings the front wheel power source into a non-operative state while allowing the rear wheel power source to drive the rear wheels,
upon receiving a predetermined four-wheel drive command, the controller brings the front wheel power source into operation while allowing the rear wheel power source to drive the rear wheels, and
upon receiving a predetermined specific travel command, the controller temporarily causes the front wheel power source to operate until a predetermined front wheel drive stopping condition is satisfied, even when the two-wheel drive command is received.

2. The utility vehicle according to claim 1, wherein
the front wheel power source comprises an electric motor, and
the rear wheel power source comprises an engine.

3. The utility vehicle according to claim 2, wherein the controller brings the electric motor into a regeneration state upon receiving a predetermined deceleration command, regardless of which of the two-wheel drive command and the four-wheel drive command has been received.

4. The utility vehicle according to claim 2, further comprising:
an electricity generator that generates electricity from power of the engine; and
an electricity storage device charged with electricity generated by the electricity generator, wherein
the electric motor is operated with electricity supplied from the electricity storage device.

5. The utility vehicle according to claim 1, wherein
the pair of front wheels consists of a left front wheel and a right front wheel, and
the utility vehicle further comprises:
- a left clutch configured to disable power transmission from the front wheel power source to the left front wheel;
- a right clutch configured to disable power transmission from the front wheel power source to the right front wheel; and
- a clutch actuator that actuates the left clutch and the right clutch.

6. The utility vehicle according to claim 1, further comprising a differential gear device disposed between the front wheel power source and the pair of front wheels.

7. The utility vehicle according to claim 1, further comprising a seat on which a user of the utility vehicle sits, wherein
the rear wheel power source is disposed rearwardly of the seat, and
the pair of rear wheels is supported by a swing arm.

8. The utility vehicle according to claim 1, further comprising:
- a seat on which a user of the utility vehicle sits; and
- a battery disposed below the seat, wherein
  the front wheel power source or the rear wheel power source is an electric motor operated with electricity supplied from the battery.

9. The utility vehicle according to claim 1, wherein the predetermined specific travel command includes a start command to start the vehicle from a stopped state.

10. The utility vehicle according to claim 9, wherein the front wheel power source comprises an electric motor.

11. The utility vehicle according to claim 9, wherein the front wheels are steering wheels.

12. The utility vehicle according to claim 9, wherein the front wheels are steering wheels, and the front wheel power source comprises an electric motor.

13. The utility vehicle according to claim 1, wherein the controller causes the front wheel power source to operate until a vehicle speed crosses a predetermined threshold, if an acceleration command is detected when the vehicle speed is lower than a predetermined value.

14. The utility vehicle according to claim 1, further comprising a transmission that provides a rotational speed change of power generated by the rear wheel power source, wherein the controller causes the front wheel power source to operate until a gear ratio of the transmission crosses a predetermined threshold on a high-speed side, if an acceleration command is detected when a vehicle speed is lower than a predetermined value.

15. The utility vehicle according to claim 1, wherein
the front wheel power source comprises an electric motor, and
upon receiving a predetermined deceleration command, the controller brings the electric motor into a regeneration state.

16. A utility vehicle comprising:
- a pair of front wheels that consists of a left front wheel and a right front wheel;
- a pair of rear wheels;
- at least one front wheel power source configured to drive the front wheels and not to drive the rear wheels;
- at least one rear wheel power source configured to drive the rear wheels and not to drive the front wheels;
- a controller that controls the front wheel power source and the rear wheel power source;
- a left clutch configured to disable power transmission from the front wheel power source to the left front wheel;
- a right clutch configured to disable power transmission from the front wheel power source to the right front wheel; and
- a clutch actuator that actuates the left clutch and the right clutch, wherein
upon receiving a predetermined two-wheel drive command, the controller brings the front wheel power source into a non-operative state while allowing the rear wheel power source to drive the rear wheels,
upon receiving a predetermined four-wheel drive command, the controller brings the front wheel power source into operation while allowing the rear wheel power source to drive the rear wheels,
the left clutch and the right clutch are clutches actuated by hydraulic pressure, and
the clutch actuator comprises:
- a hydraulic pump driven by the rear wheel power source; and
- a control valve unit configured to allow hydraulic pressure of the hydraulic pump to be applied to the left clutch and the right clutch.

* * * * *